Patented Sept. 8, 1953

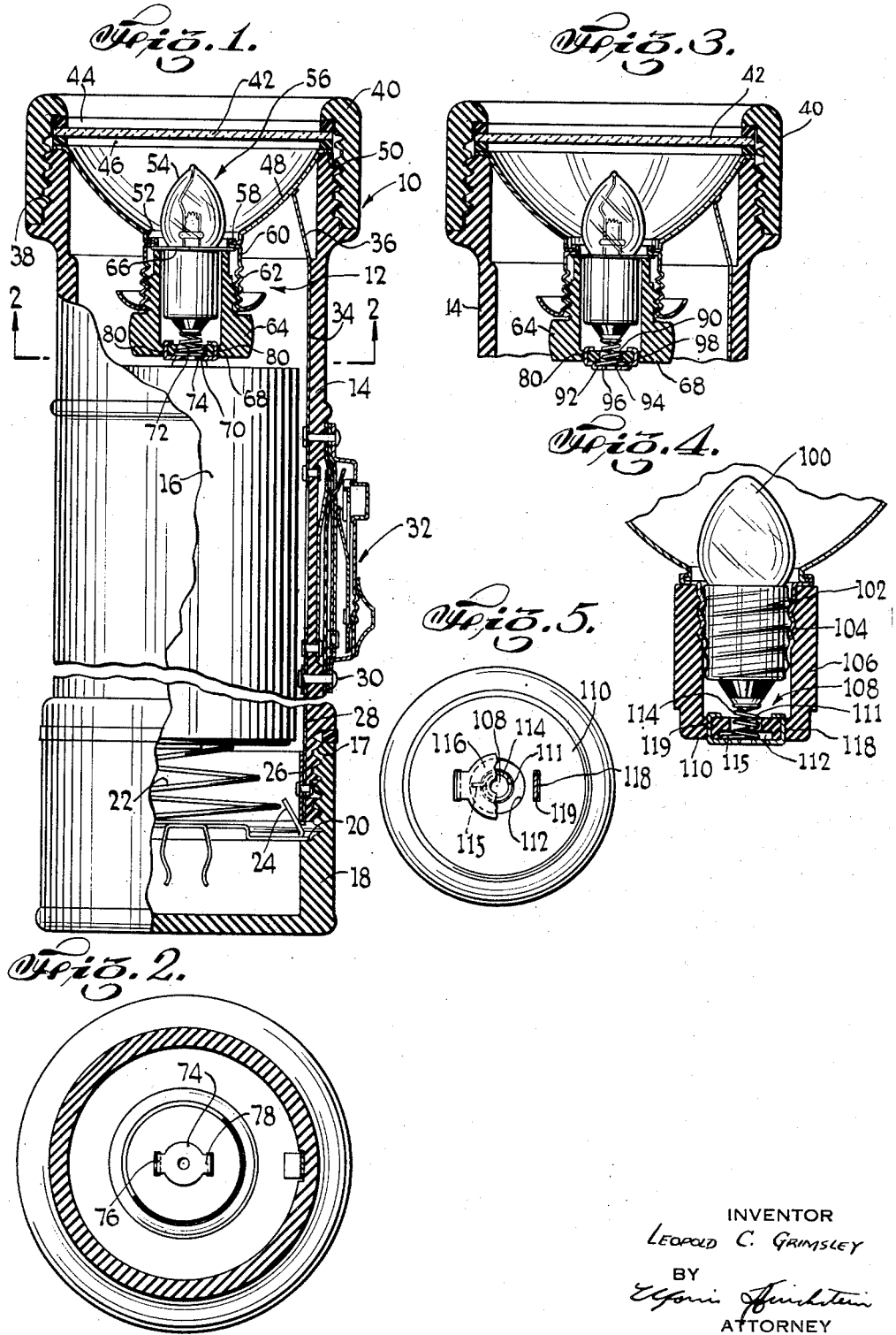

2,651,763

UNITED STATES PATENT OFFICE 2,651,763

SHOCK ABSORBER ASSEMBLY FOR PORTABLE ELECTRIC FLASHLIGHTS

Leopold C. Grimsley, New York, N. Y., assignor to Henry Hyman, New York, N. Y.

Application December 3, 1947, Serial No. 789,513

11 Claims. (Cl. 339—93)

1

This invention relates to portable electric flashlights and, more particularly, is concerned with a shock absorber assembly which is used to provide a resilient contact for the central terminal of an electric flashlight lamp. Even more specifically, the invention is concerned with an improved means for holding in place a coil spring which acts as the resilient contact and with the method for incorporating said holding means in the shock absorber assembly.

As a general rule, shock absorber assemblies are employed in connection with portable electric flashlights which have no internal partitions. Where an internal partition is used, a battery loaded in the flashlight hits against the partition but when the partition is omitted, a battery dropped into the casing would strike the central terminal of the lamp if no safeguard such as a shock absorber assembly were provided. In essence, a shock absorber assembly comprises a bushing which is secured in some conventional manner to a flashlight reflector and is provided with suitable means to at least partially house, i. e. cover, the base of the lamp. The leg of an electric circuit from the batteries to the lamp shell is made through the reflector or a lamp-receiving ferrule or the bushing. If the lamp shell is of the bull's-eye or screw type, the bushing, ferrule or reflector has a mating thread and if the shell of the lamp is of the push or pre-focus type, said thread is omitted. The bushing carries the central contact. This central contact is in the form of a resilient electrically-conductive member engaging the central terminal of the lamp and in electrical contact with a rivet or like stationary electrically-conductive member which is carried by the bushing and has a part disposed in a position where it can be abutted by the central terminal of the uppermost battery in the flashlight casing. With this arrangement, if a battery is dropped in the casing and allowed to strike sharply against the rivet, the resulting shock is not transmitted to the lamp.

Although shock absorber assemblies are highly desirable for the foregoing reason, considerable difficulty has been experienced commercially with their constructions and incorporation in flashlights. One shock absorber includes a tapered coil spring which is fitted loosely in the bushing. This type of shock absorber is easy to assemble but the spring can fall out accidentally and be lost when lamps are changed. Once the spring is lost, the flashlight is useless. Another kind of shock absorber uses a tapered coil spring which is fitted tightly in the bushing to prevent the spring from becoming loose. However, such a spring is extremely difficult to mount in proper position. Another flashlight employs a coil spring which tapers toward both ends and is frictionally held in the bushing. This spring, also, is difficult to mount and, furthermore, tends to tip sideways. Still another shock absorber uses a flat spring which is bent into an L-shape and is secured in the bushing by a rivet extending through an aperture in one of the legs of the L. After mounting, the other leg of the L is bent to an acute angle with respect to the first leg. Such a spring requires two bending operations and, after bending, is quite fragile. Yet another shock absorber uses a cylindrical coil spring which is frictionally held in the bushing. This spring, like the frictionally held springs mentioned above, is hard to mount and involves a relatively expensive and not always satisfactory assembly.

In addition to the foregoing, the springs employed had all or most of their length within the well of the bushing as a result of which a fairly long bushing had to be used.

It is an object of the present invention to provide a shock absorbed assembly which avoids all the foregoing defects by including a shock absorber spring firmly and captively held in place with a means which is easy to assemble.

It is another object of the invention to provide a shock absorber assembly in which the spring is received in an opening extending through the base of the bushing so that the length of the bushing may be reduced.

It is an additional object of the invention to provide a shock absorber assembly comprising relatively few and simple parts and which is rugged and efficient in operation.

Other objects of the invention will in part be obvious and in part be pointed out hereinafter.

The invention accordingly consists in the features of construction, combinations of elements and arrangements of parts which will be exemplified in the constructions hereinafter described and of which the scope of application will be indicated in the appended claims.

In the accompanying drawings in which are shown various possible embodiments of the invention, Fig. 1 is a side view of a flashlight partially broken away to show the shock absorber assembly which is constructed in accordance with the invention;

Fig. 2 is a sectional view taken substantially along the line 2—2 of Fig. 1;

Fig. 3 is a fragmentary view similar to Fig. 1 of the head only of a flashlight embodying a modified form of the invention;

Fig. 4 is an enlarged vertical central sectional through a shock absorber assembly embodying another form of the invention; and Fig. 5 is a bottom view in partial section of said assembly.

Essentially, the several objects of this invention are achieved by providing the shock absorber bushing with a through aperture in its base wall and disposing a lower portion of an electrically conductive shock absorber spring in said aperture. The upper end of the spring is located above the base wall of the bushing and is smaller across than the upper end of the aperture. Adjacent its bottom, the spring has a laterally extending portion which projects outwardly to a point beyond the sides of the upper end of said aperture so that it will prevent the spring from being drawn upwardly through said aperture. An electrically conductive member which spans the lower end of said aperture is in electrical contact with the spring when the spring is compressed. Said member is secured permanently to the bushing, as by providing this member with ears or the like integral extensions which pass through openings in the base of the bushing and are turned over and clinched against the interior of the bushing.

Referring now in detail to the drawings, the reference numeral 10 denotes a flashlight which is conventional in all respects save for the shock absorber assembly 12. Said flashlight comprises a molded casing 14 of synthetic resin, such, for instance, as ethyl cellulose. The casing is open at both ends and is adapted to house flashlight batteries 16. The lower end of the casing is provided with a female thread 17 on which an internally-tapped bottom cap 18 is screwed. Said cap is provided with an annular shoulder 20 to seat a tapered helical battery compression spring 22. The lower end of the spring has an inturned leg 24 which engages a metal ferrule 26 riveted to the casing at the lower end thereof. Said ferrule is in contact with a metal strip 28 running longitudinally of the casing 14 and lying against the interior surface thereof. The strip 28 is connected by a rivet 30 to a conventional manually-operable flashlight switch 32 disposed on the exterior of the casing. This switch controls energization of another metal strip 34 which runs from said switch towards the upper end of the casing and terminates in a resilient finger 36.

Said upper end of the flashlight is formed with a female thread 38 in order to have screwed thereon a lens cap 40. Said cap clamps a transparent plastic disc 42 against the upper rim of the casing. Rubber washers 44, 46 are interposed between the lens cap and plastic disc and between the plastic disc and upper rim of the flashlight casing.

The lens cap also holds in place a metal reflector 48 having an upper flange 50 caught between the lower washer 46 and the upper rim of the flashlight casing. The center of the reflector is formed with a shallow recess 52 whose base is provided with an opening larger than the envelope 54 of a flashlight lamp 56, said lamp being of the push or pre-focus type with a smooth side wall on its base. The inturned base flange 58 resulting from the provision of the central opening has secured thereto, as by clinching, a downwardly extending ferrule 60 in which a threaded portion 62 is impressed. This portion receives a threaded bushing 64 of an electrically non-conductive material, such as a plastic, the bushing being adapted to clamp the flange 66 of the pre-focus lamp against the shoulder at the upper end of the ferrule.

Said bushing is a component of the shock absorber assembly and, pursuant to the present invention, has a base wall 68 in which there is formed a through central aperture 70. A light upwardly-tapering coiled compression spring 72, longer than the base is thick, is located in said aperture. The aperture is tapered upwardly at about the same angle of inclination as the taper of the spring 72. The upper end of the aperture is smaller across than the diameter of the base of the spring 72 and larger across than the diameter of the top of said spring whereby the spring, when inserted from the bottom, small end first, as shown, can be pushed partially through the aperture so that the top end thereof extends into the space within the bushing 64 when the bottom end abuts the sloped walls of the aperture. Optionally, the lower end of the aperture has a diameter about equal to the diameter of the lower end of the spring so that this end of the spring is approximately flush with the bottom surface of the bushing when the spring is in place.

Means is provided to hold the spring in the aforementioned position. Such means constitutes a metal disc 74 which is placed over the lower end of the aperture 70 in contact with the bottom surface of the bushing. Said disc is formed with two integral ears 76, 78 which are turned upwardly, as best shown in Fig. 1, for passage through a pair of slots 80 molded in the bottom wall of the bushing. The upturned portions of the ears extend through the slots and the tips thereof are turned over to lie against the internal surface of the bushing.

The various parts of the shock absorber are assembled as follows. The spring 72 is introduced into the aperture 70 with the bushing upside down. Then the disc 74 is placed on the upturned portion of the bushing with the ears 76, 78 projecting through the slots 80. The bushing now is set on a fixture which extends into the bore of the bushing and has an anvil part adapted to contact the protruding tips of the ears 76, 78. Finally, the disc is struck smartly with a hammer or the like to press protruding parts of the ears against the anvil so that they will be turned to lie against the interior surface of the bushing.

It will be appreciated that this assembly operation is very fast and simple and, furthermore, it will be seen that the completed shock absorber assembly firmly and captively retains the spring in place.

In the modified form of the invention shown in Fig. 3, all the parts which are similar to the parts illustrated in Fig. 1 are denoted by the same reference numerals. This second form of the invention differs from the form first described principally in that a different kind of shock absorber spring is employed. The shock absorber spring 90 shown in Fig. 3 has its upper turns of the same diameter so that this upper portion of the spring comprises a light cylindrical coiled compression spring. The lower turn 92, however, is of increased diameter. The aperture 94 in the base wall 68 of the bushing 64 is of a uniform diameter slightly larger than that of the upper turns of the spring and smaller than the diameter of the lowermost turn of the spring. This arrangement allows the upper turns of the spring to be disposed in and extend above the aperture 94 while the spring is prevented from slipping upwardly through the aperture by the large lower turn 92.

The spring is held in place by a disc 96 which does not contact the bottom surface of the bushing as does the disc 74 but rather lies against the lowermost turn 92 of the disc 74 but rather lies against the lowermost turn 92 of the spring and clamps said turn between the disc and the bottom surface of the bushing. Said disc is provided with integral ears 98 which extend through the slots 80 in the base of the bushing and have their tips turned to lie against the interior surface of the bushing so that the disc is clamed in place.

In Figs. 4 and 5, there is shown a form of the invention in which a bull's-eye lamp, i. e. one having a screw base, is employed. In addition, these figures illustrate a modified form of mounting for the shock absorber spring. The lamp 100 seen in said figures has a base shell 102 on which a thread is formed. Said shell is screwed into the threaded portion of a ferrule 104 having an outwardly directed flange clamped on the flange 58 of the reflector. The ferrule has screwed on it an enveloping bushing 106 which is part of the shock absorber assembly.

A through aperture 108 is centrally located in the base 110 of said bushing. This aperture is formed in two parts, to wit, an upper part 111 and a lower concentric part 112 which is of larger diameter than the upper part. A light coiled compression spring 114 is disposed in the aperture. The upper part of said spring, comprising several turns, is of a uniform diameter slightly less than the diameter of the upper part 110 of the aperture. The lowermost turn of the spring has an outwardly projecting leg 115 which abuts against the shoulder between the two parts of the aperture. With this arrangement, the bottom of the spring can be fully seated within the aperture and not extend beyond the aperture as in the assembly illustrated in and described with respect to Fig. 3. The spring is captively held in position by a disc 116 having ears 118 disposed in slots 119 in the base wall of the bushing. The tips of the slots are inturned and clinched against the interior surface of the bushing.

It thus will be seen that there are provided shock absorber assemblies which achieve the several objects of the invention and are well adapted to meet the conditions of practical use.

As various possible embodiments might be made of the above invention, and as various changes might be made in the embodiments above set forth, it is to be understood that all matter herein described, or shown in the accompanying drawings, is to be interpreted as illustrative and not in a limiting sense.

Having thus described the invention, there is claimed as new and desired to be secured by Letters Patent:

1. For use in a flashlight, a shock absorber assembly including a bushing having a base wall provided with a through aperture, an electrically conductive coil spring extending bodily through said aperture with a lower portion disposed in the aperture and its upper end projecting above the upper end of the aperture, said upper end of the spring being smaller across than the upper end of the aperture, said spring including a portion adjacent its bottom which extends laterally outwardly to a point beyond the sides of the upper end of said aperture whereby to limit by abutment upward movement of the spring through the aperture, an electrically conductive element spanning the lower end of said aperture and in electrical contact with the spring, and means to permanently secure said element to said bushing.

2. For use in a flashlight, a shock absorber including a bushing having a base wall provided with a through aperture, an electrically conductive coil spring extending bodily through said aperture with a lower portion disposed in the aperture and the upper end projecting above the upper end of the aperture, said upper end of the spring being smaller across than the upper end of the aperture, said spring including a portion adjacent its bottom which is wider across than the upper end of the aperture, whereby to limit by abutment upward movement of the spring through the aperture, an electrically conductive element spanning the lower end of said aperture and in electrical contact with the spring, and means to permanently secure said element to said bushing.

3. For use in a flashlight, a shock absorber assembly including a bushing having a base wall provided with a through aperture, an electrically conductive coil spring extending bodily through said aperture with a lower portion disposed in the aperture and its upper end projecting above the upper end of the aperture, said upper end of the spring being smaller across than the upper end of the aperture, said spring including a portion adjacent its bottom which extends laterally outwardly to a point beyond the sides of the upper end of said aperture whereby to limit by abutment upward movement of the spring through the aperture, and an electrically conductive element spanning the lower end of said aperture and in electrical contact with the spring, said element including means to permanently secure said element to said bushing.

4. For use in a flashlight, a shock absorber assembly including a bushing having a base wall provided with a through aperture, an electrically conductive coil spring extending bodily through said aperture with a lower portion disposed in the aperture and its upper end projecting above the upper end of the aperture, said upper end of the spring being smaller across than the upper end of the aperture, said spring including a portion adjacent its bottom which extends laterally outwardly to a point beyond the sides of the upper end of said aperture whereby to limit by abutment upward movement of the spring through the aperture, and an electrically conductive element spanning the lower end of said aperture and in electrical contact with the spring, said element including integral extensions which pass through openings in the base wall of the bushing and are turned over and clinched against the interior of the bushing.

5. For use in a flashlight, a shock absorber assembly including a bushing having a base wall provided with a through aperture whose upper end is narrower across than its lower end, an electrically conductive coil spring extending bodily through said aperture with a lower portion disposed in the aperture and its upper end projecting above the upper end of the aperture, said upper end of the spring being smaller across than the upper end of the aperture, said spring including a portion adjacent its bottom which extends laterally outwardly to a point beyond the sides of the upper end of said aperture whereby to limit by abutment upward movement of the spring through the aperture, an electrically conductive element spanning the lower end of said aperture and in electrical contact with the spring, and means to permanently secure said element to said bushing.

6. For use in a flashlight, a shock absorber assembly including a bushing having a base wall provided with a through aperture the walls whereof converge upwardly, an electrically conductive coil spring extending bodily through said aperture with a lower portion disposed in the aperture and its upper end projecting above the upper end of the aperture, said upper end of the spring being smaller across than the upper end of the aperture, said spring including a portion adjacent its bottom which extends laterally outwardly to a point beyond the sides of the upper end of said aperture whereby to limit by abutment upward movement of the spring through the aperture, an electrically conductive element spanning the lower end of said aperture and in electrical contact with the spring, and means to permanently secure said element to said bushing.

7. For use in a flashlight, a shock absorber assembly including a bushing having a base wall provided with a through aperture the walls whereof converge upwardly, an upwardly tapering electrically conductive coiled compression spring extending bodily through said aperture with a lower portion disposed in the aperture and its upper end projecting above the upper end of the aperture, said upper end of the spring being smaller across than the upper end of the aperture and the lower end of said spring being wider across than the upper end of said aperture, an electrically conductive element spanning the lower end of said aperture and in electrical contact with the spring, and means to permanently secure said element to said bushing.

8. For use in a flashlight, a shock adsorber assembly including a bushing having a base wall provided with a through aperture the walls whereof converge upwardly, an upwardly tapering electrically conductive coiled compression spring extending bodily through said aperture with a lower portion disposed in the aperture and its upper end projecting above the upper end of the aperture, said upper end of the spring being smaller across than the upper end of the aperture and the lower end of said spring being wider across than the upper end of said aperture, the lower end of said spring being approximately as wide as the lower end of said aperture, an electrically conductive element spanning the lower end of said aperture and in electrical contact with the spring, and means to permanently secure said element to said bushing.

9. For use in a flashlight, a shock absorber assembly including a bushing having a base wall provided with a through aperture of uniform diameter, an electrically conductive coil spring extending bodily through said aperture, the upper portion of said spring being of uniform diameter slightly less than the diameter of said aperture and the lower portion of said spring having a part thereof extending laterally outwardly beyond the diameter of said aperture, the upper portion of said spring being longer than the length of said aperture so that said upper portion projects above the upper end of the aperture when the lower portion of the spring abuts against the bushing, an electrically conductive element spanning the lower end of said aperture and in electrical contact with the spring, and means to permanently secure said element to said bushing.

10. A shock absorber assembly, as set forth in claim 9, wherein the outwardly extending lower portion of the spring abuts against the bottom surface of the bushing and is clamped between said surface and the electrically conductive element.

11. For use in a flashlight, a shock absorber assembly including a bushing having a base wall provided with a through aperture, said aperture including an upper portion and a lower portion, said portions being concentrically arranged and the upper portion being of lesser diameter than the lower portion, an electrically conductive coil spring extending bodily through said aperture with the lower portion disposed in the aperture and its upper end projecting above the upper end of the aperture, said upper end of the spring being smaller across than the upper portion of the aperture, said spring including a portion adjacent its bottom which extends laterally outwardly to a point beyond the sides of the upper portion of said aperture, whereby to limit by abutment upward movement of the spring through the aperture, an electrically conductive element spanning the lower end of the bottom portion of said aperture and in electrical contact with the spring, and means to permanently secure said element to said bushing.

LEOPOLD C. GRIMSLEY.

References Cited in the file of this patent

UNITED STATES PATENTS

| Number | Name | Date |
| --- | --- | --- |
| 1,104,577 | Thomas | July 21, 1914 |
| 1,296,404 | Koretzky | Mar. 4, 1919 |
| 1,779,804 | Dubilier | Oct. 28, 1930 |
| 1,933,304 | Bell | Oct. 31, 1933 |
| 2,129,961 | Rabezzana | Sept. 13, 1938 |
| 2,271,421 | Gits | Jan. 27, 1942 |
| 2,272,907 | Deibel | Feb. 10, 1942 |
| 2,287,505 | Wood | June 23, 1942 |
| 2,384,287 | Drury | Sept. 4, 1945 |